Figure 1:
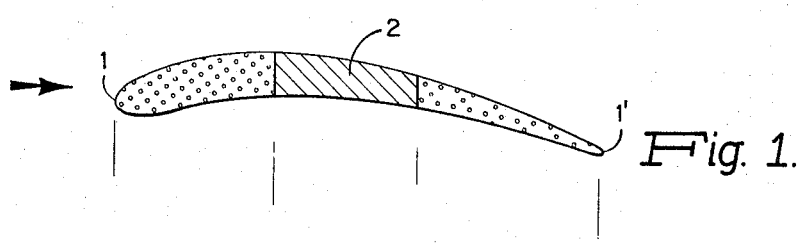

United States Patent [19]
Hayden et al.

[11] 3,779,338
[45] Dec. 18, 1973

[54] METHOD OF REDUCING SOUND GENERATION IN FLUID FLOW SYSTEMS EMBODYING FOIL STRUCTURES AND THE LIKE

[75] Inventors: Richard Earle Hayden, Arlington, Mass.; Robert Charles Chanaud, Boulder, Colo.

[73] Assignee: Bolt, Beranek and Newman, Inc., Cambridge, Mass.

[22] Filed: Jan. 27, 1972

[21] Appl. No.: 221,223

[52] U.S. Cl............ 181/33 C, 181/33 H, 181/35 R, 244/1 N, 415/119, 416/231
[51] Int. Cl.......................... G10k 11/00, F01d 5/12
[58] Field of Search.................... 415/119; 416/224, 416/227–231, 241; 244/1 N, 123; 181/33 HA, 33 HB, 33 A, 33 C, 33 H, 35 R, 33 R, 63

[56] References Cited
UNITED STATES PATENTS

| | | | |
|---|---|---|---|
| 1,717,745 | 6/1929 | Tismer | 416/231 X |
| 1,946,129 | 2/1934 | Cebulski | 416/230 X |
| 2,333,555 | 11/1943 | Prucha | 416/230 X |
| 2,340,417 | 2/1944 | Ellett | 416/231 |
| 2,759,554 | 8/1956 | Baruch | 181/33 HB UX |
| 3,044,559 | 7/1962 | Chajmik | 416/231 X |
| 3,402,914 | 9/1968 | Kump et al. | 416/231 |
| 3,477,231 | 11/1969 | Paulson | 181/33 HA UX |
| 3,481,427 | 12/1969 | Dobbs et al. | 181/33 HA UX |
| 3,666,043 | 5/1972 | Eschenburg | 181/33 HA |
| 2,935,151 | 5/1960 | Watters et al. | 181/33 R X |
| 3,266,130 | 8/1966 | Glaze | 244/123 X |

OTHER PUBLICATIONS

Labate, S. Porous Material for Noise Control in Noise Control. 2(1): P. 15–19 and 72. Jan., 1956.

*Primary Examiner*—Richard B. Wilkinson
*Assistant Examiner*—John F. Gonzales
*Attorney*—Rines and Rines

[57] ABSTRACT

This disclosure deals with preventing or at least reducing sound generation that normally results from fluid flow in various rotor and stator systems about the foil or blade surfaces from the developed fluid forces, by rendering at least portions of the blade of reduced flow impedance, as by rendering the same porous in various degrees.

7 Claims, 4 Drawing Figures

METHOD OF REDUCING SOUND GENERATION IN FLUID FLOW SYSTEMS EMBODYING FOIL STRUCTURES AND THE LIKE

The present invention relates to methods of and structures for reducing sound generation in fluid flow systems embodying foil structures and the like, being more particularly concerned with sounds generated by the interaction of such structures with fluid flow in, for example, jet engines, lift-augmenting systems for STOL aircraft, compressors and the like (at both rotor and stator blades), in air and marine propeller blades, and in vane and fan systems, including low-speed fans where quiet operation is desired; all such and similar structures generically being referred to hereinafter as foils.

Many techniques and structures have been proposed and used through the years for quieting the sounds generated by the relatively moving air or other fluid flow about such foil surfaces. Duct linings, as an example, have been so employed to silence such sounds, as described in U.S. Pat. Nos. 2,759,554, 2,759,555, 2,759,556 issued to Bolt Beranek and Newman, Inc., the assignee of the present invention. Active and passive muffling structures have also been employed as described, for example, in U.S. Pat. Nos. 2,893,508 and 3,132,717.

In accordance with the present invention and the discoveries underlying the same, however, it has been found possible greatly to reduce the actual generation of the sound in the first place, rather than to permit the noise to be generated and then to absorb the same. This approach, indeed, eliminates or makes less stringent the requirement for muffling or absorbing structures.

An object of the invention, accordingly, is to provide a new and improved method of and structure for reducing sound generation in fluid flow systems embodying foils and the like, minimizing the generation of the fluid flow forces about foil surfaces and thus preventing the sound generation in the first instance, so as to obviate the requirement for copious absorption structures as above described.

A further object is to provide a novel fluid flow foil structure and the like of more general application, as well.

Other and further objects will be explained hereinafter and are more particularly delineated in the appended claims. In summary, the novel results of the invention have been attained by reducing the fluid flow forces interacting with foil surfaces in a controlled manner by reducing the fluid flow impedance of the foil surfaces themselves, particularly in the vicinity of the edges thereof, as by different degrees of porosity of portions of the foil structure. Preferred details are hereinafter presented.

Figure 2:
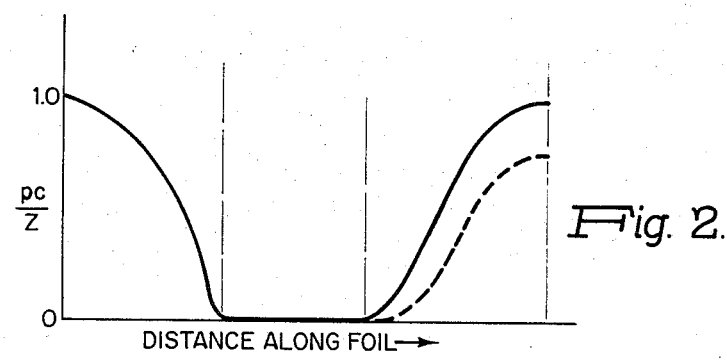
Figure 3:
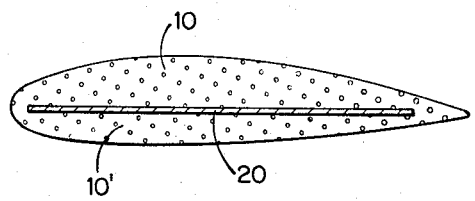
Figure 4:
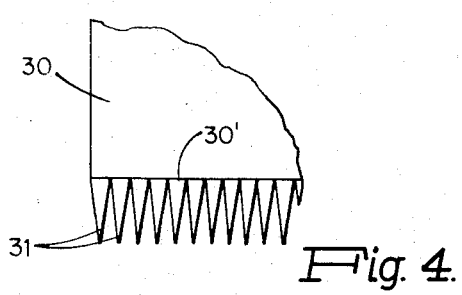

The invention will now be described with reference to the accompanying drawing,

FIG. 1 of which is a transverse cross-sectional view of a rotor or stator blade or lift-augmenting flap foil constructed in accordance with the techniques underlying the present invention;

FIG. 2 is a graph plotting the ratio of the characteristic impedance of the fluid medium to the fluid flow impedance of the foil blade as a function of position along the foil blade of FIG. 1; and FIG. 3 is a view similar to FIG. 1 and FIG. 4 is a fragmentary top elevation of modifications.

Referring to FIG. 1, a foil structure is illustrated in the form of the airfoil type, as used in a wide variety of machinery, singly and in combination, and, as before explained, normally generating serious deleterious noise sounds by interacting with fluid flowing thereabout. Propellers, compressors, turbines, jets, wings and control surfaces all generate such noise as a result of the fluctuating surface forces produced by the interaction of these foils with up-stream turbulence and by turbulent flow generated by the foil itself. When the acoustic wavelength is longer than the air foil chord, the foil acts like a single source of dipole sound, the radiated sound pressure being directly correlated with the equiphase fluctuating lift on the air foil.

For the case where the acoustical wavelength is much less than the airfoil chord length, on the other hand, strong independent effective dipole sources may exist at both the leading and trailing foil surface edges. In the system of FIG. 1, these fluctuating pressures and the attendant sound generation or radiation is effectively reduced by rendering the leading and trailing edge portions 1 and 1' porous to the fluid medium, such as air. Such porous airfoil surfaces have been found to contribute to the reduction of noise generation apparently because of several phenomena. First, flow oscillations may be conducted through the porous surface material at portions 1 and 1' between the upper and lower surfaces or between points on the same surface, thereby avoiding substantial pressure fluctuations. Secondly, the porous surface itself may be less able to support a shear stress than the customary solid or impervious foil surface, thereby causing the development of a much less intense turbulent boundary layer. Finally, steady flow through the porous foil portions results in a thickened wake and reduced pressure fluctuations on downstream airfoil portions, as in the case of stator or rotor vanes in compressors and the like.

In FIG. 2, the ratio of the characteristic impedance $\rho c$ (density times velocity of acoustic wave propagation) of the air itself (or other fluid medium) to the flow impedance Z of the airfoil structure is plotted as a function of horizontal distance along the foil structure shown in FIG. 1. The porous structure of the leading edge 1 results in the downwardly curving left-hand portion from unity ratio to zero at the solid or impervious intermediate section 2; and with an upwardly curving right-hand portion over the region of the porous trailing edge 1'. In some cases, as in certain turbulent flow applications, the porosity of the leading edge should be made greater than that of the trailing edge as illustrated in FIG. 1, producing the dotted-line right-hand characteristic, for example, of FIG. 2. Additionally, the porous sections 1 and 1' will also act as acoustic absorbers of noise otherwise generated in the fluid-flow system prior to its interaction with the foil structures.

When geometric constraints permit, the edges of the foil should be extended, thus permitting more gradual impedance gradient. The impervious intermediate foil section(s) 2, moreover, may be most advantageous in cases where the somewhat reduced lift on the airfoil caused by the porous nature of portions thereof is to be increased. The used of an impervious septum 20, FIG. 3, between the upper and lower porous portions 10 and 10', with the septum preferably terminating short of the forward and rear edges of the foil structure, may also assist in this particular.

In the case of a simple completely porous airfoil, good pressure cancellation results between the upper and lower surfaces with reduced edge noise and a reduced velocity gradient in the wake that can be most beneficial to rotor-stator interactions. Aerodynamically, the steady through-flow of such a structure will increase the drag and decrease the lift. The porous material, however, will have lower strength per unit weight than impervious or solid foil material.

In the case of the porous air foil with a rigid, solid or impervious divider 20, as in FIG. 3, reduced edge noise will result. This construction appears to be most effective for reducing inlet turbulence noise at acoustic wavelengths very much greater than the maximum thickness of the airfoil. Such a structure provides high aerodynamic lift and low drag due to the zero steady throughflow. Structurally, the airfoil has been rendered somewhat stronger because of the solid divider.

In the event, however, that the divider 20 is made impervious but not rigid, being, to the contrary, a flexible foil or plate, acoustical benefits are obtained at frequencies less than the ratio of the acoustic impedance to the surface mass density of the airfoil. With partially porous foil sections, on the other hand, in FIG. 1, the trailing edge noise will be reduced with only partial degradation of aerodynamic characteristics.

In experimental tests with a blade of porous fibre metal, for example, having an impedance of the order of 3 $\rho_o c_o$ (where the $o$- subscripts represent air), and about 2 inches long, 1 inch wide and one-eighth inch thick, from 8 to 18 db improvement over an identical solid foil was obtained in 1/3 octave band sound power level (re $10^{-12}$w) over a frequency range of from 630 to 12,500 HZ.

The limits of practical porosity and resulting airflow impedance reduction that have been found useful in accordance with the technique of the invention are between about $\rho_o c_o$ to about 10 $\rho_o c_o$.

For air at standard temperature and pressure conditions $\rho_o c_o = 41.6$ c.g.s.Ryals. Thus, 10 $\rho_o c_o = 416$ c.g.s. Rayls.

Reduction in the inherent foil flow impedance, particularly at the trailing edge, may also be effected in other ways than by porosity of the foil structure, as by closely spaced trailing comb-like protrusions 31, shown extending from the trailing edge 30' of an airfoil 30 in the embodiment of FIG. 4. The dimensioning and spacing of the comb teeth will enable the desired adjustment of flow impedance, the flow resistance being high near the junctions of the teeth and low near the tips. This is not to be confused with leading-edge serrations and the like used on wing and similar structures for the very different purpose and function of tripping the boundary layer to prevent discreet-frequency vortex shedding at sub-critical Reynolds numbers, and which are incapable of serving as impedance gradient producing devices as herein required.

Further modifications will also occur to those skilled in this art and all such are considered to fall within the spirit and scope of the invention as defined in the appended claims.

What is claimed is:

1. In a fluid-flow system wherein fluid of a medium flows at substantial pressures about the surfaces of a foil and the like normally giving rise to fluid forces that generate sound, a method of reducing such sound generation, that comprises, reducing the fluid-flow forces interacting with the foil surfaces by reducing the flow impedance of at least one of leading and trailing edge portions of said surfaces to a value substantially closer to the characteristic impedance of the medium, whereby the flow impedance and the characteristic impedance are substantially matched.

2. A method as claimed in claim 1 and in which said reducing is effected by rendering said surfaces porous.

3. A method as claimed in claim 2 and in which the degree of porosity is varied for different portions of said foil.

4. A method as claimed in claim 1 and in which at least one portion of said foil is maintained solid.

5. A method as claimed in claim 1 and in which an intermediate portion of said foil is maintained impervious.

6. A method as claimed in claim 1 and in which the ratio of the reduced flow impedance to the characteristic impedance of the medium is within the range of substantially 1 to substantially 10.

7. A method as claimed in claim 1 and in which the reducing of the flow impedance comprises providing a comb-like structure protruding from said trailing edge portion.

* * * * *